(12) United States Patent
Nago

(10) Patent No.: US 10,256,672 B2
(45) Date of Patent: Apr. 9, 2019

(54) POWER TRANSFER SYSTEM, POWER RECEIVING APPARATUS, CONTROL METHOD, AND STORAGE MEDIUM FOR DETERMINING WHEN RECEIVED POWER IS DETERIORATED

(71) Applicant: CANON KABUSHIKI KAISHA, Tokyo (JP)

(72) Inventor: Hidetada Nago, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 306 days.

(21) Appl. No.: 14/890,886

(22) PCT Filed: Apr. 24, 2014

(86) PCT No.: PCT/JP2014/062120
§ 371 (c)(1),
(2) Date: Nov. 12, 2015

(87) PCT Pub. No.: WO2014/185287
PCT Pub. Date: Nov. 20, 2014

(65) Prior Publication Data
US 2016/0094052 A1 Mar. 31, 2016

(30) Foreign Application Priority Data
May 16, 2013 (JP) .................. 2013-104518

(51) Int. Cl.
*H02J 50/60* (2016.01)
*H02J 50/40* (2016.01)
(Continued)

(52) U.S. Cl.
CPC .............. *H02J 50/60* (2016.02); *H02J 5/005* (2013.01); *H02J 7/025* (2013.01); *H02J 17/00* (2013.01);
(Continued)

(58) Field of Classification Search
CPC .............. H04B 5/00; H02J 50/60; H02J 50/80
(Continued)

(56) References Cited

U.S. PATENT DOCUMENTS 9,762,092 B2 * 9/2017 Jung ...................... H02J 50/12
2008/0200119 A1 8/2008 Onishi et al.
(Continued)

FOREIGN PATENT DOCUMENTS

EP 2573902 A2 3/2013
JP 2004-215225 A 7/2004
(Continued)

*Primary Examiner* — Adi Amrany
(74) *Attorney, Agent, or Firm* — Canon U.S.A., Inc. IP Division

(57) ABSTRACT

A first power receiving apparatus observes a power transfer signal from a power supply apparatus, and detects whether power transfer is being performed between the power supply apparatus and a second power receiving apparatus. When the power transfer is being performed between the power supply apparatus and the second power receiving apparatus, a waveform of the signal is deformed with a predetermined pattern. The second power receiving apparatus detects deterioration in power which is received from the power supply apparatus and detects whether the waveform of the signal changes with the predetermined pattern within a predetermined time after detecting the power deterioration. When detecting the change in the waveform of the signal with the predetermined pattern, the second power receiving apparatus determines that the first power receiving apparatus is in a power suppliable range of the power supply apparatus.

20 Claims, 6 Drawing Sheets

(51) Int. Cl.
*H02J 50/80* (2016.01)
*H02J 50/12* (2016.01)
*H02J 5/00* (2016.01)
*H02J 7/02* (2016.01)
*H02J 17/00* (2006.01)
*H04B 5/00* (2006.01)

(52) U.S. Cl.
CPC .............. *H02J 50/12* (2016.02); *H02J 50/40* (2016.02); *H02J 50/80* (2016.02); *H04B 5/0031* (2013.01); *H04B 5/0037* (2013.01)

(58) Field of Classification Search
USPC ......................................................... 307/104
See application file for complete search history.

(56) References Cited

U.S. PATENT DOCUMENTS

| | | | | |
|---|---|---|---|---|
| 2010/0001845 A1* | 1/2010 | Yamashita | .............. | H02J 7/025 340/10.4 |
| 2012/0038317 A1* | 2/2012 | Miyamoto | .............. | H02J 7/025 320/108 |
| 2012/0091993 A1* | 4/2012 | Uramoto | ................. | H02J 7/025 324/105 |
| 2013/0062961 A1 | 3/2013 | Park et al. | | |
| 2013/0063085 A1* | 3/2013 | Takada | ................... | B60L 11/182 320/108 |
| 2013/0076153 A1* | 3/2013 | Murayama | .............. | H02J 7/025 307/104 |
| 2013/0257168 A1* | 10/2013 | Singh | ...................... | H02J 17/00 307/104 |
| 2013/0264887 A1* | 10/2013 | Arisawa | ............... | G01D 5/2006 307/104 |
| 2013/0285620 A1* | 10/2013 | Yamamoto | ........... | H02J 7/0029 320/155 |
| 2014/0103733 A1* | 4/2014 | Irie | ........................ | H02J 5/005 307/104 |
| 2014/0111018 A1* | 4/2014 | Kwon | ..................... | H02J 5/005 307/104 |
| 2014/0125287 A1* | 5/2014 | Nakano | ................... | H02J 5/005 320/128 |
| 2014/0159503 A1* | 6/2014 | Murakami | .............. | H01F 38/14 307/104 |
| 2014/0191568 A1* | 7/2014 | Partovi | ................... | H02J 7/025 307/9.1 |

FOREIGN PATENT DOCUMENTS

| | | |
|---|---|---|
| JP | 2008-206231 A | 9/2008 |
| JP | 2009-011129 A | 1/2009 |

* cited by examiner

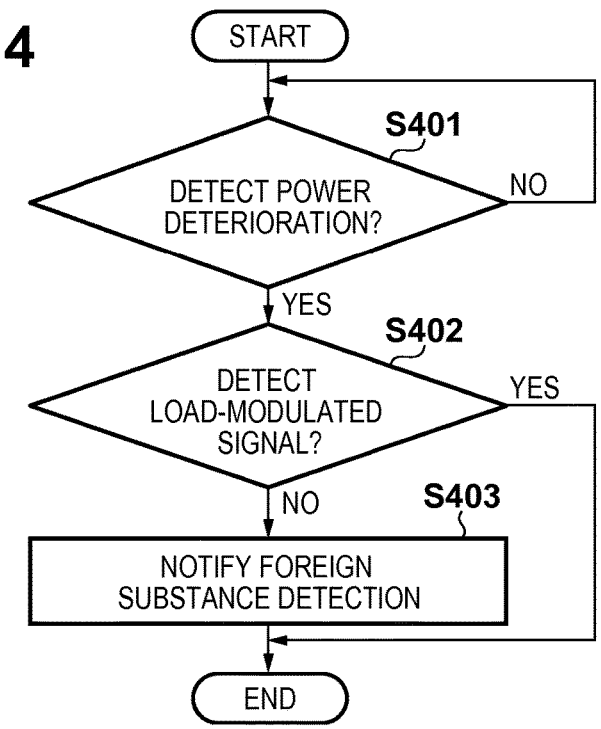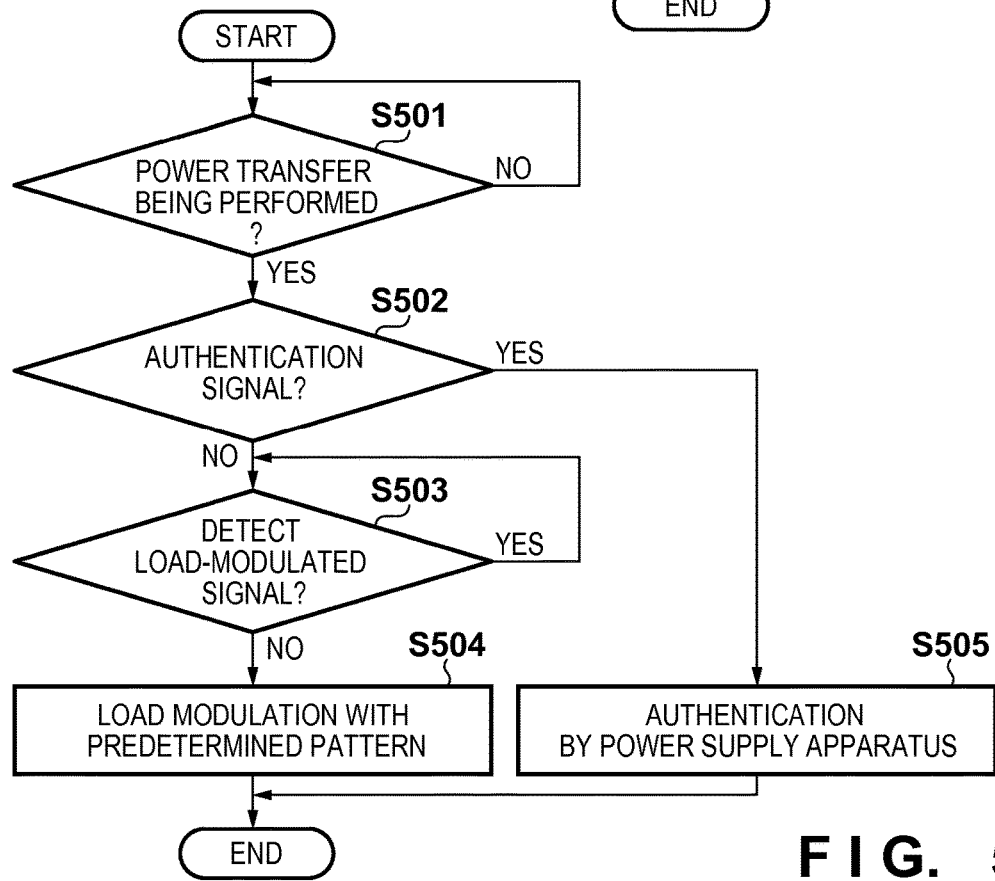

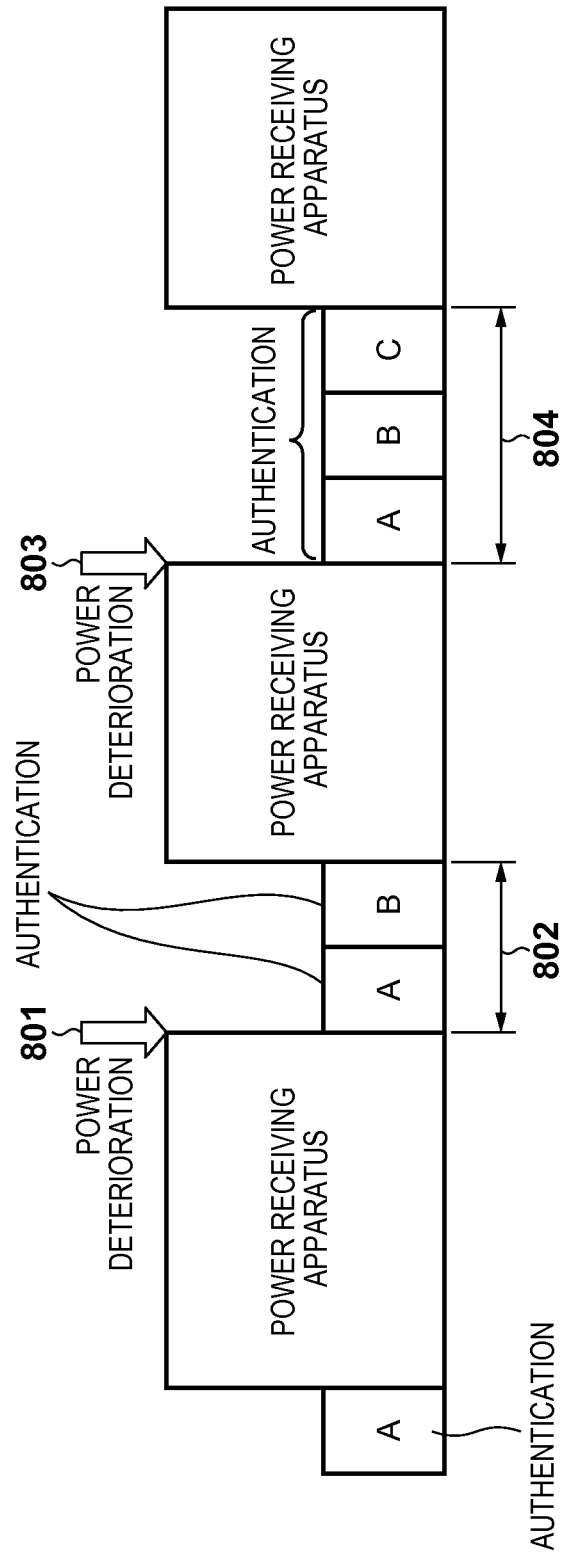

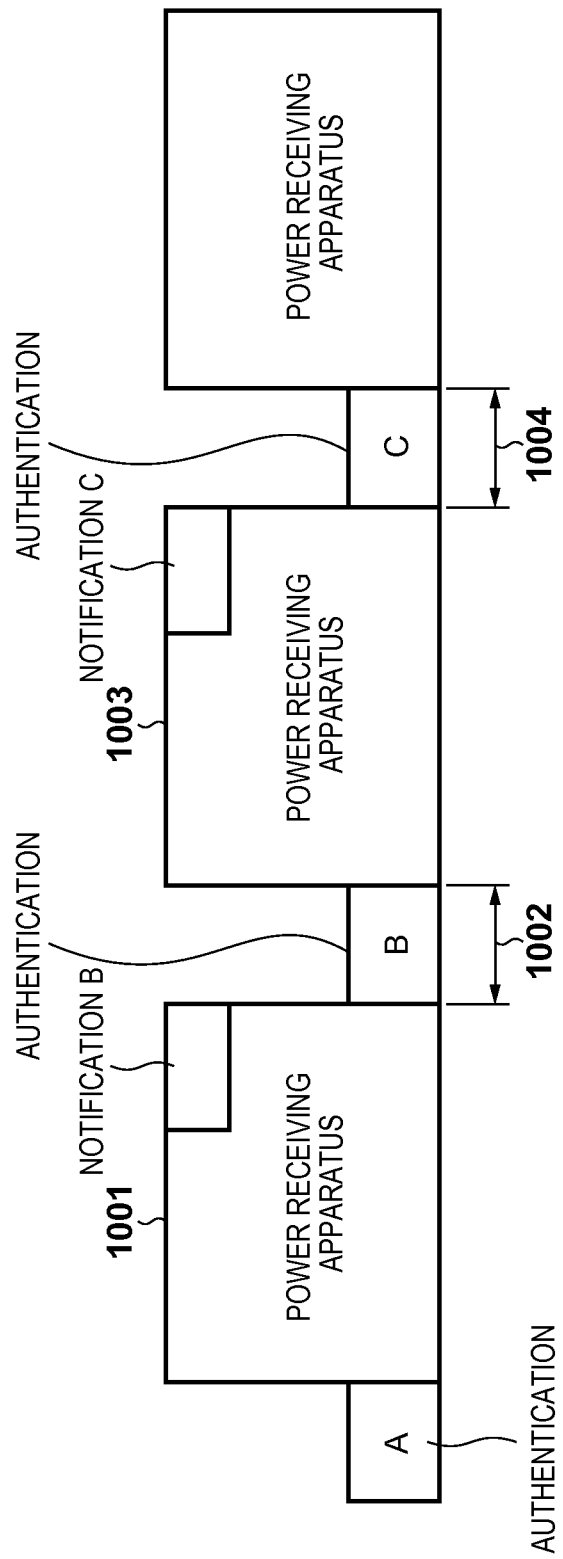

POWER TRANSFER SYSTEM, POWER RECEIVING APPARATUS, CONTROL METHOD, AND STORAGE MEDIUM FOR DETERMINING WHEN RECEIVED POWER IS DETERIORATED

TECHNICAL FIELD

The present invention relates to an environment recognition technique in wireless power transfer.

BACKGROUND ART

Recently, wireless power transfer, in which power is transferred wirelessly without using a metal contact such as a connector, has been placed into practical use. In the wireless power transfer, a power supply apparatus and a power receiving apparatus transmit/receive control signals or the like to exchange information for various control operations such as a notification of required power. For example, a load modulation scheme is used for transmitting/receiving the control signals. Particularly, as a method of sending information from the power receiving apparatus to the power supply apparatus, a method of changing the load on the power receiving apparatus side to transmit data for a power transfer signal sent by the power supply apparatus is known (see Japanese Patent Laid-Open No. 2004-215225 and Japanese Patent Laid-Open No. 2008-206231).

Furthermore, in the recent wireless power transfer, the use of a resonant magnetic coupling scheme has been examined. The resonant magnetic coupling scheme is advantageous in that power transfer is possible in a wide range, compared to an electromagnetic induction scheme where the power supply apparatus and the power receiving apparatus have to be very near. For this reason, in the resonant magnetic coupling scheme, it is also possible to supply power to a plurality of power receiving apparatuses simultaneously.

When performing wireless power transfer, if there is a foreign substance such as a metal fragment near a power supply apparatus, an eddy current is generated in that foreign substance, increasing power consumption. Therefore, in this case, power to be received deteriorates in a power receiving apparatus which receives power supply. Similarly, power is also received in another power receiving apparatus when the other power receiving apparatus gets closer to the power supply apparatus, resulting in the deterioration of power to be received in the power receiving apparatus. That is, the power receiving apparatus cannot discriminate between a case in which there is the foreign substance and a case in which there is the other power receiving apparatus from the received power deterioration, and cannot distinguish between an abnormal state in which power is consumed by the foreign substance and a normal state in which a plurality of power receiving apparatuses share power.

The present invention has been made in consideration of the aforementioned problems, and can specify the cause of a change in received power in wireless power transfer.

SUMMARY OF INVENTION

According to one aspect of the present invention, there is provided a power transfer system comprising a power supply apparatus, and a first power receiving apparatus and a second power receiving apparatus which receive power supply from the power supply apparatus, the first power receiving apparatus comprising first detection means for observing a power transfer signal from the power supply apparatus, and detecting whether power transfer is being performed between the power supply apparatus and the second power receiving apparatus, and deformation means for deforming a waveform of the signal with a predetermined pattern when the power transfer is being performed between the power supply apparatus and the second power receiving apparatus, and the second power receiving apparatus comprising second detection means for detecting deterioration in power which is received from the power supply apparatus and detecting whether the waveform of the signal changes with the predetermined pattern within a predetermined time after detecting the power deterioration, and determination means for determining that the first power receiving apparatus is in a power suppliable range of the power supply apparatus when detecting the change in the waveform of the signal with the predetermined pattern.

According to one aspect of the present invention, there is provided a power receiving apparatus for receiving power supply from a power supply apparatus, comprising: detection means for observing a power transfer signal from the power supply apparatus, and detecting whether power transfer is being performed between the power supply apparatus and another power receiving apparatus; and deformation means for deforming a waveform of the signal with a predetermined pattern when the power transfer is being performed between the power supply apparatus and the other power receiving apparatus.

According to another aspect of the present invention, there is provided a power receiving apparatus for receiving power supply from a power supply apparatus, comprising: detection means for detecting deterioration in power which is received from the power supply apparatus and detecting whether a waveform of a power transfer signal from the power supply apparatus changes with a predetermined pattern within a predetermined time after detecting the power deterioration; and determination means for determining that another power receiving apparatus is in a power suppliable range of the power supply apparatus when detecting the change in the waveform of the signal with the predetermined pattern.

According to another aspect of the present invention, there is provided a method of controlling a power transfer system including a power supply apparatus, and a first power receiving apparatus and a second power receiving apparatus which receive power supply from the power supply apparatus, comprising: in the first power receiving apparatus, causing first detection means to observe a power transfer signal from the power supply apparatus, and detect whether power transfer is being performed between the power supply apparatus and the second power receiving apparatus, and causing deformation means to deform a waveform of the signal with a predetermined pattern when the power transfer is being performed between the power supply apparatus and the second power receiving apparatus; and in the second power receiving apparatus, causing second detection means to detect deterioration in power which is received from the power supply apparatus and detect whether the waveform of the signal changes with the predetermined pattern within a predetermined time after detecting the power deterioration, and causing determination means to determine that the first power receiving apparatus is in a power suppliable range of the power supply apparatus when detecting the change in the waveform of the signal with the predetermined pattern.

According to another aspect of the present invention, there is provided a method of controlling a power receiving apparatus which receives power supply from a power supply apparatus, comprising: causing detection means to observe a power transfer signal from the power supply apparatus, and detect whether power transfer is being performed between the power supply apparatus and another power receiving apparatus; and causing deformation means to deform a waveform of the signal with a predetermined pattern when the power transfer is being performed between the power supply apparatus and the other power receiving apparatus.

According to another aspect of the present invention, there is provided a method of controlling a power receiving apparatus which receives power supply from a power supply apparatus, comprising: causing detection means to detect deterioration in power which is received from the power supply apparatus and detect whether a waveform of a power transfer signal from the power supply apparatus changes with a predetermined pattern within a predetermined time after detecting the power deterioration; and causing determination means to determine that another power receiving apparatus is in a power suppliable range of the power supply apparatus when detecting the change in the waveform of the signal with the predetermined pattern.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

FIG. 4 is a flowchart showing an operation of the power receiving apparatus when received power deteriorates;

FIG. 5 is a flowchart showing a process of the power receiving apparatus when entering a power suppliable range of the power supply apparatus;

FIG. 8 is a conceptual view showing the power of a power transfer signal when a plurality of power receiving apparatuses perform authentication processes temporally continuously;

FIG. 10 is a conceptual view showing the power of the power transfer signal when some of the authentication processes are omitted.

DESCRIPTION OF EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
(System Arrangement)

Figure 1:
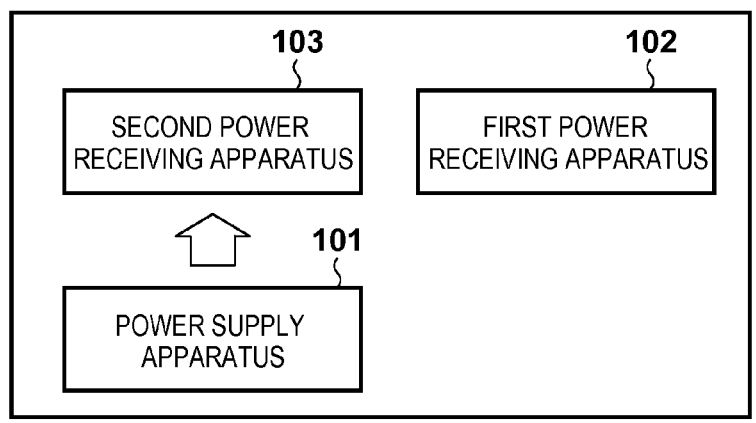
FIG. 1 is a view showing an example of the arrangement of a power transfer system.

FIG. 1 is a view showing an example of the arrangement of a power transfer system for performing wireless power transfer. The power transfer system shown in FIG. 1 includes, for example, a power supply apparatus 101, a first power receiving apparatus 102, and a second power receiving apparatus 103. The power supply apparatus 101 supplies power using, for example, a resonant magnetic coupling scheme to at least one of the first power receiving apparatus 102 and the second power receiving apparatus 103. Note that the first power receiving apparatus 102 and the second power receiving apparatus 103 are apparatuses which receive and use power. Each of them is, for example, a portable device, a personal computer, and an electric car.

In the following description, a case in which the first power receiving apparatus 102 is in a power suppliable range of the power supply apparatus 101 under the circumstance where the power supply apparatus 101 is supplying power to the second power receiving apparatus 103 and the apparatus 103 is receiving the power from the apparatus 101 will be described.

(Arrangement of Power Receiving Apparatus)

Figure 2:
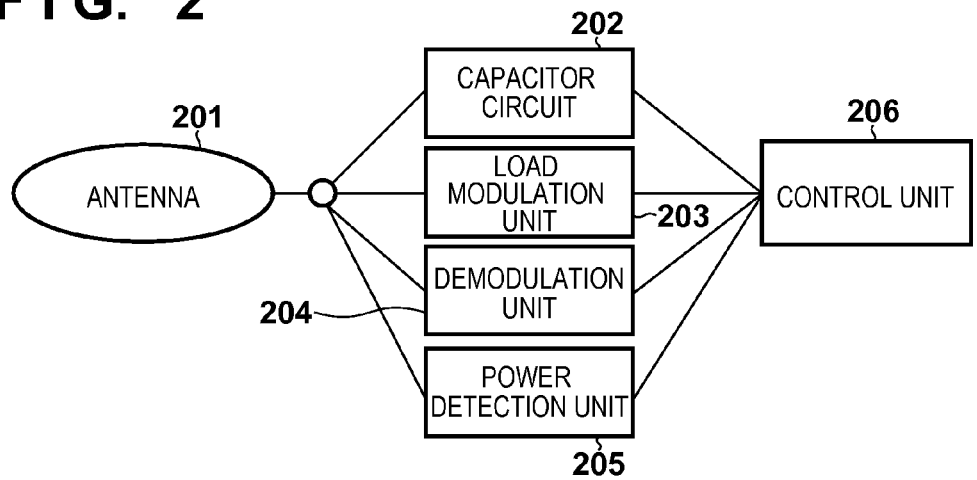
FIG. 2 is a block diagram showing an example of the arrangement of each power receiving apparatus.

FIG. 2 shows an example of the arrangement of each power receiving apparatus (the first power receiving apparatus 102 or the second power receiving apparatus 103). Note that FIG. 2 only shows blocks regarding wireless power transfer in the arrangement of each power receiving apparatus. Each power receiving apparatus includes, for example, as shown in FIG. 2, an antenna 201, a capacitor circuit 202, a load modulation unit 203, a demodulation unit 204, a power detection unit 205, and a control unit 206.

The antenna 201 is used to receive power supplied from the power supply apparatus 101. The capacitor circuit 202 is a capacitor circuit to cope with instantaneous interruption of received power and, for example, a super capacitor circuit. The load modulation unit 203 performs load modulation on a power transfer signal which has been transmitted from the power supply apparatus to deform the signal with a predetermined pattern in order to transmit predetermined data to the power supply apparatus. When receiving the signal on which another power receiving apparatus has performed load modulation to transmit the predetermined data, the demodulation unit 204 demodulates the signal. The power detection unit 205 observes the power transfer signal from the power supply apparatus 101, and detects whether power transfer is performed between the power supply apparatus 101 and the other power receiving apparatus, that is whether the power supply apparatus 101 supplies power to the other power receiving apparatus. The power detection unit 205 also detects a change in received power. More specifically, the power detection unit 205 detects, for example, power deterioration caused by the fact that the other power receiving apparatus or a foreign substance is in the power suppliable range of the power supply apparatus 101. The control unit 206 is a functional unit which controls the entire power receiving apparatus, and controls, for example, the capacitor circuit 202, the load modulation unit 203, the demodulation unit 204, and the power detection unit 205.

Note that the first power receiving apparatus 102 and the second power receiving apparatus 103 may have all of these functions, or may only have some of them. Furthermore, the power supply apparatus 101, the first power receiving apparatus 102, and the second power receiving apparatus 103 are described to transmit/receive data by load modulation. However, the present invention is not limited to this. The power supply apparatus 101, the first power receiving apparatus 102, and the second power receiving apparatus 103 may transmit/receive data by, for example, deforming the waveform of the power transfer signal with the predetermined pattern by means of another method.

(Arrangement of Power Supply Apparatus)

Figure 3:
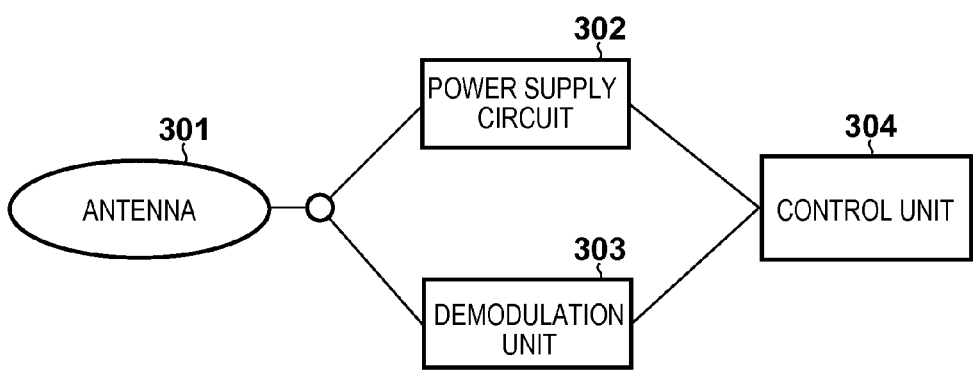
FIG. 3 is a block diagram showing an example of the arrangement of a power supply apparatus.

FIG. 3 is a block diagram showing an example of the arrangement of the power supply apparatus 101. Note that FIG. 3 only shows blocks regarding wireless power transfer of the power supply apparatus 101. The power supply apparatus 101 includes, for example, as shown in FIG. 3, an antenna 301, a power supply circuit 302, a demodulation unit 303, and a control unit 304. The antenna 301 is used to transmit a signal for supplying power to each power receiving apparatus. The power supply circuit 302 controls power supplied from the antenna 301. The demodulation unit 303 demodulates a load-modulated signal transmitted by each power receiving apparatus. The control unit 304 is a functional unit which controls the entire power supply apparatus 101, and controls, for example, the power supply circuit 302 and the demodulation unit 303. Note that the power supply apparatus 101 may have all of these functions, or some of them may be omitted.

(Power Transfer Process)

Control operations of the power supply apparatus 101, first power receiving apparatus 102, and the second power receiving apparatus 103 during power transfer according to the first embodiment will be described below. FIG. 4 is a flowchart showing a process when received power deteriorates in the second power receiving apparatus 103 which is receiving power supply from the power supply apparatus 101. FIG. 5 is a flowchart showing a process when the first power receiving apparatus 102 enters a power suppliable range of the power supply apparatus 101.

First, a process of the second power receiving apparatus 103 in a power receiving state will be described. In the second power receiving apparatus 103 in the power receiving state, the power detection unit 205 observes the power transfer signal supplied from the power supply apparatus 101, and determines whether power deteriorates (step S401). If no power deterioration is detected (NO in step S401), power transfer between the second power receiving apparatus 103 and the power supply apparatus 101 is continued.

On the other hand, if the power deterioration is detected (YES in step S401), the second power receiving apparatus 103 determines, after detection of power deterioration and within a predetermined time, whether to receive a signal which has undergone load modulation by the other power receiving apparatus (the first power receiving apparatus 102) (step S402). That is, the second power receiving apparatus 103 determines, after detection of the power deterioration and within the predetermined time, whether load modulation has been performed on the power transfer signal transmitted from the power supply apparatus 101.

Figure 6A:
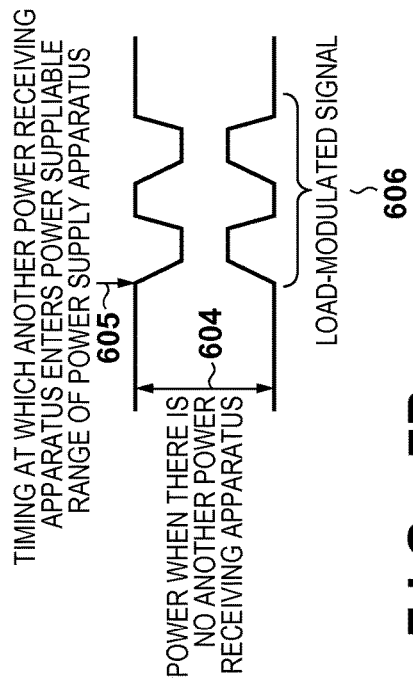
FIGS. 6A and 6B are views showing examples of a change in the received power.
Figure 6B:
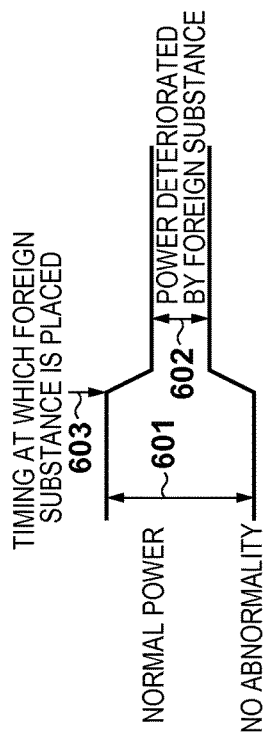

Examples of signal waveforms when load modulation is performed/not performed on the power transfer signal are shown in FIGS. 6A and 6B. FIG. 6A shows a change in the waveform of the power transfer signal when a foreign substance is placed on the power supply apparatus 101. In FIG. 6A, the foreign substance is placed on the power supply apparatus 101 (603) while the second power receiving apparatus 103 receives normal power 601, resulting in received power deterioration (602). When the foreign substance is placed, the amplitude of the power transfer signal afterwards is generally constant, and a load-modulated signal with a predetermined pattern is not detected.

On the other hand, as shown in FIG. 6B, when the other power receiving apparatus enters the power suppliable range of the power supply apparatus 101, as in the case in which the foreign substance is placed, received power also deteriorates (605) compared to power when there is no other power receiving apparatus (604). That is, if there are a plurality of power receiving apparatuses, power is shared between them, resulting in reducing power that one power receiving apparatus can receive.

Figure 7A:
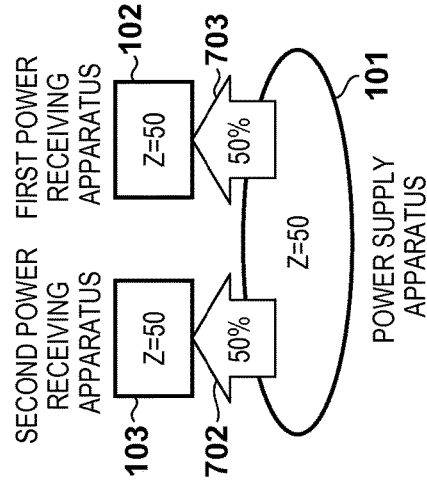
FIGS. 7A and 7B are conceptual views showing the relationship between the number of the power receiving apparatuses near the power supply apparatus and the received power.
Figure 7B:
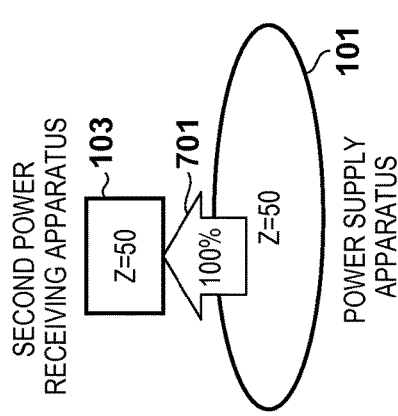

FIGS. 7A and 7B are views schematically showing the relationship between the number of power receiving apparatuses and power received by each power receiving apparatus. 701 of FIG. 7A shows power received by the second power receiving apparatus 103 when there is one power receiving apparatus, and 702 and 703 of FIG. 7B show powers received by the second power receiving apparatus 103 and the first power receiving apparatus 102 when there are two power receiving apparatuses. The characteristic impedances of the two power receiving apparatuses are the same. Therefore, when there are two power receiving apparatuses, power supplied by the power supply apparatus 101 is divided in two, and then received.

However, in a case of power deterioration caused by the other power receiving apparatus, since load modulation is performed by the other power receiving apparatus afterwards, the amplitude of the power transfer signal is deformed with a predetermined pattern (606) as shown in FIG. 6B. That is, the first power receiving apparatus 102 deforms the signal transmitted by the power supply apparatus 101 with the predetermined pattern by the load modulation, and transmits predetermined data. Therefore, the second power receiving apparatus 103 can determine whether the load-modulated signal is transmitted by detecting whether a change in this power transfer signal coincides with the predetermined pattern or whether the predetermined data has been received.

When determining that the load-modulated signal is received (YES in step S402), the second power receiving apparatus 103 determines that the other power receiving apparatus has entered the power suppliable range of the power supply apparatus 101. In this case, since the operation is normal, the power transfer process remains continued, for example. On the other hand, when determining that the load-modulated signal is not received (NO in step S402), the second power receiving apparatus 103 determines that the foreign substance causes received power deterioration. In this case, since an abnormality has occurred, for example, this abnormality state (existence of the foreign substance) is notified to the power supply apparatus 101, thereby stopping power supply. Note that when receiving the notification of the abnormality, the power supply apparatus 101 may, for example, notify a user of the second power receiving apparatus 103 to remove the foreign substance by displaying a notice that the abnormality has been detected on a display unit (not shown) or the like without stopping power supply.

Note that the first power receiving apparatus 102 may notify the power supply apparatus 101 that it is different from the foreign substance by performing predetermined load modulation when monitoring a power transmission status of the power supply apparatus 101. Furthermore, at this time, the first power receiving apparatus 102 may differentiate a load modulation pattern when monitoring from that at the time of initial processing. This allows the power supply apparatus 101 to easily discriminate which one of the known power receiving apparatus and unknown power receiving apparatus is in the power suppliable range by differentiating the load modulation pattern when monitoring from that at the time of initial processing.

Next, processing of the first power receiving apparatus 102 which enters the power suppliable range of the power supply apparatus 101 when power transfer is performed between the power supply apparatus 101 and the second power receiving apparatus 103 will be described with reference to FIG. 5. In the first power receiving apparatus 102, the power detection unit 205 first observes the power transfer signal from the power supply apparatus 101, and detects whether power transfer is being performed between the power supply apparatus 101 and the second power receiving apparatus 103 (step S501). More specifically, the first power receiving apparatus 102 detects, at a position where it exists, whether there is an observable combination of a power supply apparatus and a power receiving apparatus performing power transfer. If no power is detected, for example, it is determined that no power transfer is being performed (NO in step S501), and the observation of the power transfer signal is continued.

On the other hand, when detecting that power transfer is being performed between the power supply apparatus 101 and the second power receiving apparatus 103 (YES in step S501), the first power receiving apparatus 102 determines whether the observed power transfer signal is an authentication signal (step S502). Transmission of this authentication signal corresponds, for example, to the temporary power transmission disclosed in Japanese Patent Laid-Open No. 2009-011129. In this case, the first power receiving apparatus 102 determines, for example, whether a signal for temporary power transmission is received. If the observed power transfer signal is the authentication signal (YES in step S502), the first power receiving apparatus 102 performs an authentication process for receiving power supply from the power supply apparatus 101 between itself and the power supply apparatus 101 (step S505), and the process ends.

On the other hand, if the observed power transfer signal is not the authentication signal (NO in step S502), the first power receiving apparatus 102 determines whether load modulation is performed on the power transfer signal, and more specifically, whether the load-modulated signal is received (step S503). When the second power receiving apparatus 103 performs load modulation, even if the first power receiving apparatus 102 performs additional load modulation, the second power receiving apparatus 103 cannot detect this. Hence, when detecting that load modulation is performed on the power transfer signal (YES in step S503), the first power receiving apparatus 102 waits until a period in which no load modulation is performed without performing additional load modulation on the signal. Then, the first power receiving apparatus 102 performs, in the period in which no load modulation is performed on the power transfer signal (NO in step S503), load modulation with a predetermined pattern on the power transfer signal which is sent from the power supply apparatus 101 (step S504). This allows the second power receiving apparatus 103 to receive a load-modulated signal reliably.

Above-described processing allows the second power receiving apparatus 103 to discriminate whether received power deterioration is caused by an abnormality (foreign substance) or the other power receiving apparatus (first power receiving apparatus 102) entering the power suppliable range of the power supply apparatus 101. Accordingly, the efficiency of power transfer can be improved by, for example, stopping power supply in a case of received power deterioration due to a foreign substance or notifying a user that there is the foreign substance.

<Second Embodiment>

The second embodiment describes a case in which a power supply apparatus 101 which detects a first power receiving apparatus 102 temporarily stops power supply to a second power receiving apparatus 103 and authenticates the first power receiving apparatus 102. The first power receiving apparatus 102 and the second power receiving apparatus 103 receive the power supply from the power supply apparatus 101 after succeeding in the authentication. In the following description, assume that an authentication process between the second power receiving apparatus 103 and the power supply apparatus 101 has completed.

Conventionally, in authentication for power transfer, power transfer between one power supply apparatus and one power receiving apparatus is assumed. The power receiving apparatus performs the authentication when detecting an authentication signal from the power supply apparatus. When this is applied to a case in which there are a plurality of power receiving apparatuses, for example, as shown in FIG. 8 and the authentication signal is transmitted from the power supply apparatus, the plurality of power receiving apparatuses are assumed to continuously perform the authentication. In this case, for example, the second power receiving apparatus 103 must be authenticated again even though it has already been authenticated and is receiving power supply. In an example of FIG. 8, the power supply apparatus performs authentication when there is power deterioration and an unknown power receiving apparatus is detected (801). At that time, authentication A which has already been performed is performed, performing two authentication operations, namely authentication A and authentication B (802). After that, when an unknown power receiving apparatus is detected once again, the already performed authentication A and authentication B are performed once again (804).

During the authentication process, a signal is transmitted with power lower than that in power transfer, thus decreasing power received in the power receiving apparatus. Therefore, if similar authentication operations are thus repeated many times, the ratio of time at which power supply is actually performed can decrease, thereby degrading the efficiency of power transfer. It is possible to cope with power deterioration during an authentication phase by providing a capacitor circuit 202. However, it is necessary to provide the capacitor circuit 202 for the maximum time of the authentication phase. For this reason, as shown in FIG. 8, when three power supply apparatuses are accommodated, the large-capacitance capacitor circuit 202 which is capable of coping with the authentication phase for three power supply apparatuses needs to be arranged for each power receiving apparatus. FIG. 8 also shows a state in which the authentication succeeds. However, there is also a case in which the power supply apparatus 101 does not supply power by considering that there is some foreign substance when the authentication fails. This may further degrade the efficiency of power transfer.

Figure 9:
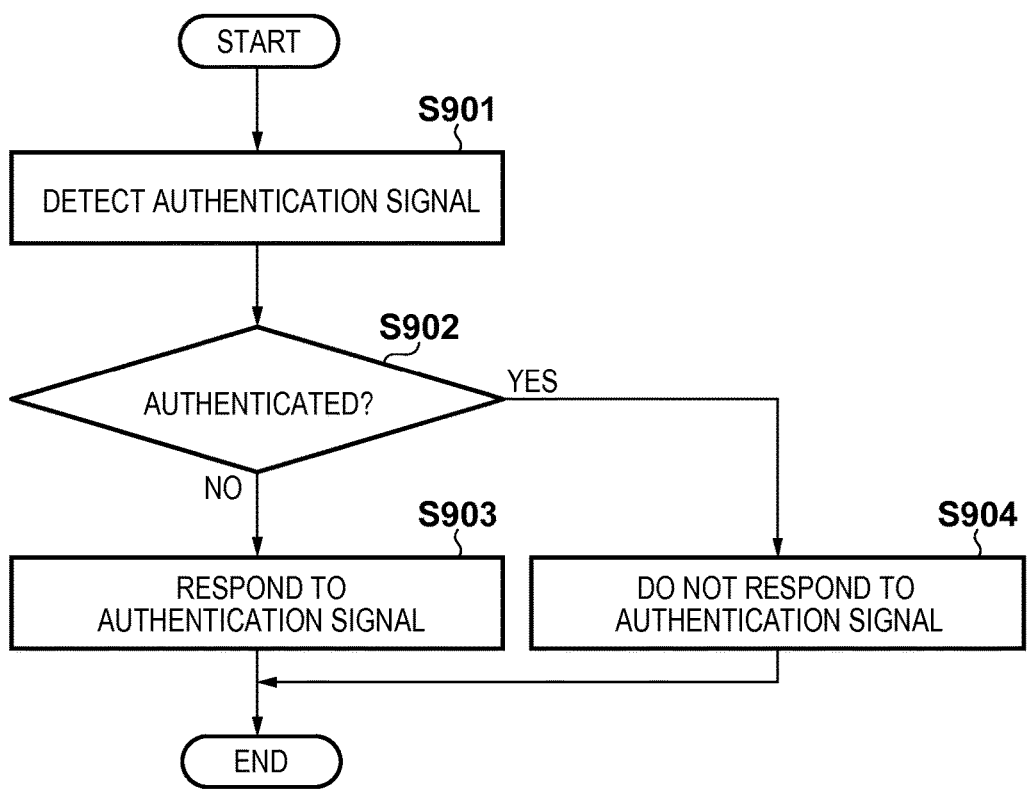
FIG. 9 is a flowchart showing an operation at the time of authentication by the power receiving apparatus.

To prevent this, in the second embodiment, in order to shorten the time of the authentication phase, the power receiving apparatus which has been receiving power supply after succeeding in the authentication does not respond to the authentication signal, and only the power receiving apparatus which newly starts receiving power responds to it. FIG. 9 shows an operation of this process.

In the process of FIG. 9, upon detecting load modulation performed by the other power receiving apparatus in the power transfer signal, the power receiving apparatus starts using charges of the capacitor circuit 202 for the authentication phase. Then, upon detecting the authentication signal from the power supply apparatus 101 (step S901), the power receiving apparatus determines whether the authentication between itself and the power supply apparatus 101 has completed (step S902). When the authentication has completed (YES in step S902), the power receiving apparatus does not respond to the authentication signal (step S904). On the other hand, when the authentication has not completed yet (NO in step S902), the power receiving apparatus responds to the authentication signal (step S903).

In the second embodiment, since the second power receiving apparatus 103 has already been authenticated and is receiving power supply, it does not respond to the authentication signal. On the other hand, since the first power receiving apparatus 102 newly enters the power suppliable range of the power supply apparatus 101, it has not been authenticated yet. Therefore, upon receiving the authentication signal, the first power receiving apparatus 102 responds to the signal to perform the authentication process between itself and the power supply apparatus 101. After succeeding in the authentication, the first power receiving apparatus 102 starts receiving power from the power supply apparatus 101.

FIG. 10 shows power of the power transfer signal in this case. First, assume that authentication has completed between a power supply apparatus and a power receiving apparatus A. At this time, upon detecting that load modulation has been performed by a power receiving apparatus B during the transmission of the power transfer signal (1001), the power supply apparatus transits to an authentication phase to send an authentication signal. The power receiving apparatus A does not respond to this authentication signal, since it has already been authenticated. On the other hand, the power receiving apparatus B responds to this authentication signal to perform an authentication process, since it has not been authenticated yet (1002). This makes it possible to omit additional authentication for the power receiving apparatus A which has already been authenticated, thereby shortening the time of the authentication phase. In the same manner, when detecting that load modulation has been performed by a power receiving apparatus C during the transmission of the power transfer signal (1003), the power receiving apparatus A and the power receiving apparatus B do not respond to the authentication signal even if they receive it because the authentication for them has already completed. As a result, only the power receiving apparatus C responds to the authentication signal (1004). This makes it possible to shorten the time for the authentication phase as compared to the case in FIG. 8.

As described above, in the second embodiment, authentication for a newly added power receiving apparatus is only performed in an authentication phase which is performed after detecting a load-modulated signal from another power receiving apparatus. This makes it enough for each power receiving apparatus to, regardless of the accommodated number of the power supply apparatuses, have the capacitor circuit 202 which is capable of coping with the authentication phase for one power supply apparatus.

According to the present invention, it is possible to specify the cause of a change in received power in wireless power transfer.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-104518, filed May 16, 2013, which is hereby incorporated by reference herein in its entirety.

The invention claimed is:

1. A power transfer system comprising a power supply apparatus, and a power receiving apparatus which receive power supply from said power supply apparatus, the power receiving apparatus comprising a power receiving unit configured to wirelessly receive power from the power supply apparatus;

a determination unit configured to determine, when power received by the power receiving unit deteriorates, whether or not another power receiving apparatus exists within a range over which the power supply apparatus transmits power by detecting communication between the power supply apparatus and the another power receiving apparatus; and a transmission unit configured to transmit, to the power supply apparatus, a limitation signal for causing the power supply apparatus to limit supply of power in a case where the determination unit determines that the another power receiving apparatus does not exist within the range when power received by the power receiving unit deteriorates;

the power supply apparatus comprising a control unit configured to limit wirelessly performing supply of power in a case where the limitation signal is received.

2. The system according to claim 1, wherein the determination unit determines that the another power receiving apparatus exists within the range, in a case where a waveform of a signal based on power received from the power supply apparatus changes with a predetermined pattern within a predetermined period since the deterioration of power received from the power supply apparatus is detected.

3. The system according to claim 2, wherein the waveform having the predetermined pattern is the waveform formed by a load modulation, performed by the another power receiving apparatus, based on power received from the power supply apparatus.

4. The system according to claim 2, wherein the system further comprising the another power receiving apparatus, and the another power receiving apparatus comprises a deformation unit configured to deform the waveform of the signal based on power received from the power supply apparatus with the predetermined pattern while the power receiving apparatus does not perform a load modulation based on power received from the power supply apparatus.

5. The system according to claim 1, wherein the power supply apparatus comprises an authentication unit configured to perform authentication between the power supply apparatus and the another power receiving apparatus when the power supply apparatus does not receive the limitation signal.

6. The system according to claim 5, wherein the power supply apparatus stops power supply to the power receiving apparatus while the authentication between the power supply apparatus and the another power receiving apparatus is being performed.

7. The system according to claim 1, wherein the power receiving apparatus comprises a responding unit configured to respond to the power supply apparatus upon detecting a signal for authentication from the power supply apparatus before completion of an authentication process with the power supply apparatus, and not to respond to the power supply apparatus even when detecting a signal for authentication from the power supply apparatus while accepting supply of power from the power supply apparatus after completion of the authentication process.

8. The system according to claim 1, wherein the power receiving apparatus comprises a responding unit configured to respond to the power supply apparatus upon detecting a signal for authentication from the power supply apparatus before completion of an authentication process with the power supply apparatus, and not to respond to the power supply apparatus, while authentication process is performed between the power supply apparatus and the another power receiving apparatus, even upon detecting a signal for authentication from the power supply apparatus.

9. A power receiving apparatus comprising:
a power receiving unit configured to receive power that is wirelessly supplied from a power supply apparatus;
a determination unit configured to determine, when power received by the power receiving unit deteriorates, whether or not another power receiving apparatus exists within a range over which the power supply apparatus transmits power by detecting communication between the power supply apparatus and the another power receiving apparatus; and
a transmission unit configured to transmit, to the power supply apparatus, a limitation signal for causing the power supply apparatus to limit supply of power in a case where the determination unit determines that the another power receiving apparatus does not exist within the range when power received by the power receiving unit deteriorates.

10. The power receiving apparatus according to claim 9, wherein the determination unit determines that the another power receiving apparatus exists within the range, in a case where a predetermined signal indicative of existence of the another power receiving apparatus is received within a predetermined period since the deterioration of power received from the power supply apparatus is detected.

11. The power receiving apparatus according to claim 9, wherein the determination unit determines that the another power receiving apparatus exists within the range, in a case where a waveform of a signal based on power received from the power supply apparatus changes with a predetermined pattern since the deterioration of power received from the power supply apparatus is detected.

12. The power receiving apparatus according to claim 11, wherein a waveform having the predetermined pattern is a waveform formed by the another power receiving apparatus.

13. The power receiving apparatus according to claim 11, wherein a waveform having the predetermined pattern is a waveform formed by a load modulation, performed by the another power receiving apparatus, based on power received from the power supply apparatus.

14. The power receiving apparatus according to claim 9, wherein the limitation signal transmitted by the transmission unit is a signal indicative of existence of a substance different from the power receiving apparatus.

15. The power receiving apparatus according to claim 9, wherein the power receiving apparatus continues to receive power in a case where the determination unit determines that the another power receiving apparatus exists within the range.

16. The power receiving apparatus according to claim 9, further comprising a responding unit configured to respond to the power supply apparatus upon detecting a signal for authentication from the power supply apparatus before completion of an authentication process with the power supply apparatus, and not to respond to the power supply apparatus even when detecting a signal for authentication from the power supply apparatus while accepting supply of power from the power supply apparatus after completion of the authentication process.

17. The power receiving apparatus according to claim 9, wherein the power supply apparatus stops power supply to the power receiving apparatus while the authentication between the power supply apparatus and the another power receiving apparatus is being performed.

18. The power receiving apparatus according to claim 9, wherein the power receiving apparatus comprises a responding unit configured to respond to the power supply apparatus upon detecting a signal for authentication from the power supply apparatus before completion of an authentication process with the power supply apparatus, and not to respond to the power supply apparatus, while authentication process is performed between the power supply apparatus and the another power receiving apparatus, even upon detecting a signal for authentication from the power supply apparatus.

19. A method of controlling a power receiving apparatus which comprises a power receiving unit configured to receive power that is wirelessly supplied from a power supply apparatus, the method comprising:
determining, when power received by the power receiving unit deteriorates, whether or not another power receiving apparatus exists within a range over which the power supply apparatus transmits power by detecting communication between the power supply apparatus and the another power receiving apparatus; and
transmitting, to the power supply apparatus, a limitation signal for causing the power supply apparatus to limit supply of power in a case where it is determined in the determining that the another power receiving apparatus does not exist within the range when power received by the power receiving unit deteriorates.

20. A computer-readable storage medium storing a computer program for causing a computer included in a power receiving apparatus which comprises a power receiving unit configured to receive power that is wirelessly supplied from a power supply apparatus to execute:
determining, when power received by the power receiving unit deteriorates, whether or not another power receiving apparatus exists within a range over which the power supply apparatus transmits power by detecting communication between the power supply apparatus and the another power receiving apparatus; and transmitting, to the power supply apparatus, a limitation signal for causing the power supply apparatus to limit supply of power in a case where it is determined in the determining that the another power receiving apparatus does not exist within the range when power received by the power receiving unit deteriorates.

\* \* \* \* \*